United States Patent
Kim et al.

(10) Patent No.: US 11,924,742 B2
(45) Date of Patent: Mar. 5, 2024

(54) METHOD AND APPARATUS FOR OBTAINING SYSTEM INFORMATION

(71) Applicant: LG Electronics Inc., Seoul (KR)

(72) Inventors: Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1125 days.

(21) Appl. No.: 16/610,280

(22) PCT Filed: Apr. 30, 2018

(86) PCT No.: PCT/KR2018/004989
§ 371 (c)(1),
(2) Date: Nov. 1, 2019

(87) PCT Pub. No.: WO2018/203633
PCT Pub. Date: Nov. 8, 2018

(65) Prior Publication Data
US 2022/0361087 A1 Nov. 10, 2022

Related U.S. Application Data

(60) Provisional application No. 62/492,962, filed on May 2, 2017.

(51) Int. Cl.
*H04W 48/02* (2009.01)
*H04W 48/16* (2009.01)

(52) U.S. Cl.
CPC .......... *H04W 48/02* (2013.01); *H04W 48/16* (2013.01)

(58) Field of Classification Search
CPC .............................. H04W 48/02; H04W 48/16
See application file for complete search history.

(56) References Cited

U.S. PATENT DOCUMENTS

2018/0132168 A1* 5/2018 Ingale .................. H04W 48/12

FOREIGN PATENT DOCUMENTS

WO    WO2016198909    12/2016

OTHER PUBLICATIONS

Ericsson, "NR minimum SI at network sharing," R2-1702860, 3GPP TSG-RAN WG2 #97bis, Spokane, USA, dated Apr. 3-7, 2017, 4 pages.
Huawei, HiSilicon, "System information acquisition for eRemote UE," R2-1702954, 3GPP TSG-RAN WG2 Meeting #97bis, Spokane, Washington, dated Apr. 3-7, 2017, 4 pages.
(Continued)

*Primary Examiner* — Diane D Mizrahi
(74) *Attorney, Agent, or Firm* — Fish & Richardson P.C.

(57) ABSTRACT

Systems and techniques for obtaining system information in a wireless communication system include: receiving a System Information Block Type 1 (SIB1) from a first cell, the SIB1 including information for acquiring an on-demand SI; requesting the on-demand SI to the first cell; based on the on-demand SI being not received from the first cell in a first specific period of time after the requesting the on-demand SI to the first cell is successful, re-requesting the on-demand SI to the first cell; and based on the on-demand SI being not received from the first cell in a second specific period of time after a total number of requesting the on-demand SI to the first cell reaches a maximum value, re-selecting a second cell under assumption that the first cell is a barred cell.

12 Claims, 8 Drawing Sheets

(A) SI request using MSG1

(B) SI request using MSG3

(56) References Cited

OTHER PUBLICATIONS

InterDigital Communications, "Procedure for Request and Acquisition of Other-SI," R2-1702877, 3GPP TSG-RAN WG2 Meeting #97bis, Spokane, Washington, dated Apr. 3-7, 2017, 3 pages.
PCT International Search Report in International Application No. PCT/KR2018/004989, dated Aug. 27, 2018, 10 pages.
Samsung, "System Information Signalling Design in NR," R2-163371, 3GPP TSG-RAN WG2 Meeting #94, Nanjing, China, dated May 23-27, 2016, 7 pages.

* cited by examiner

[Fig. 1]
E-UMTS
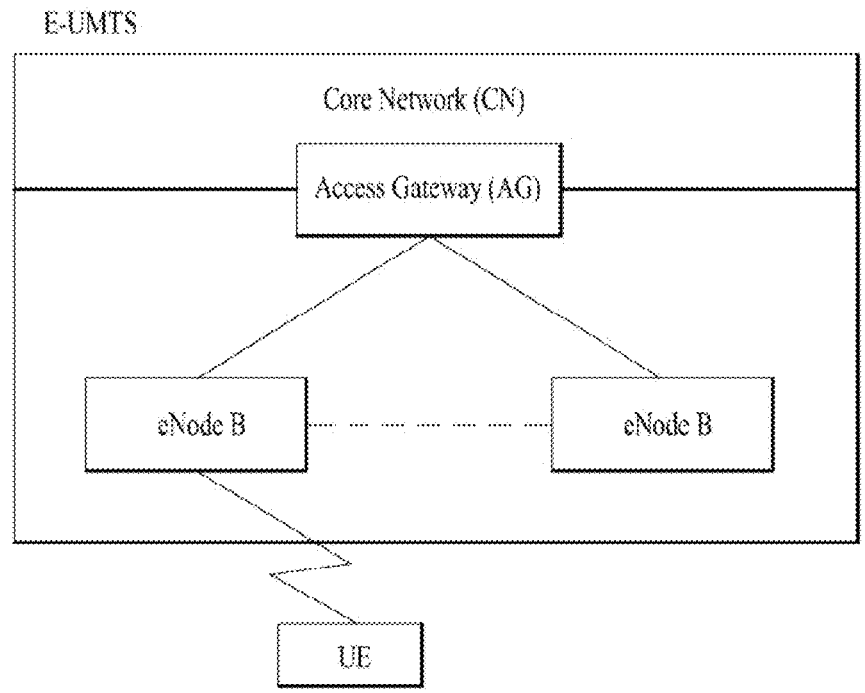
[Fig. 2A]
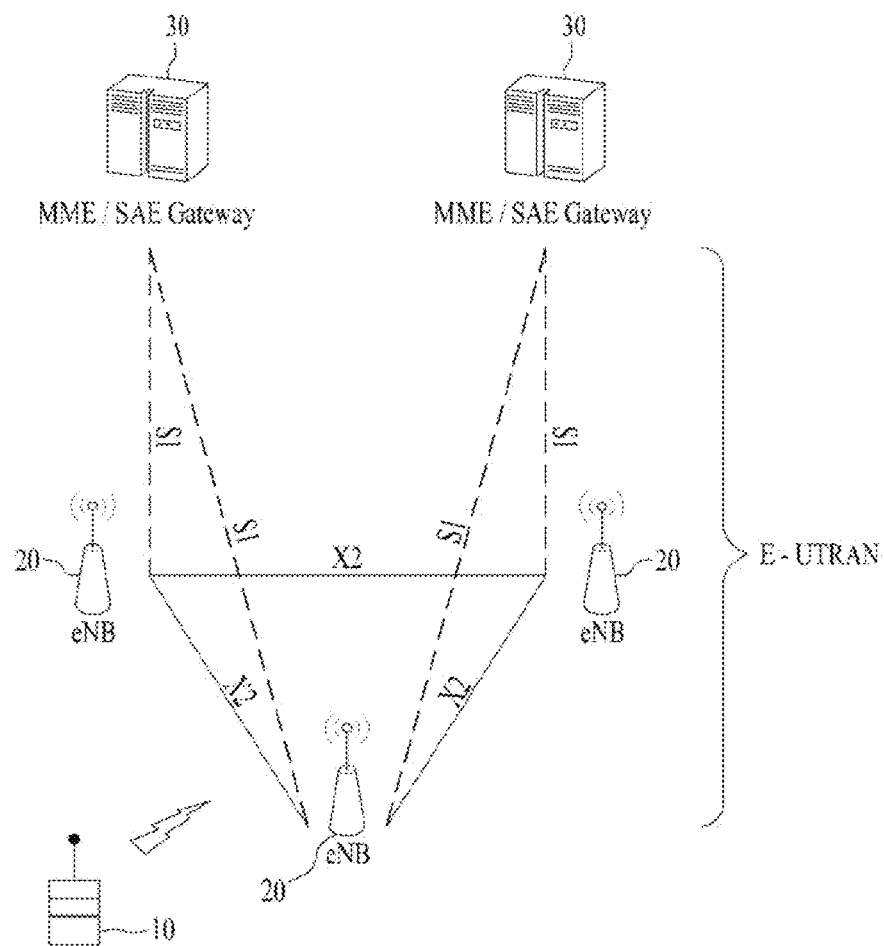

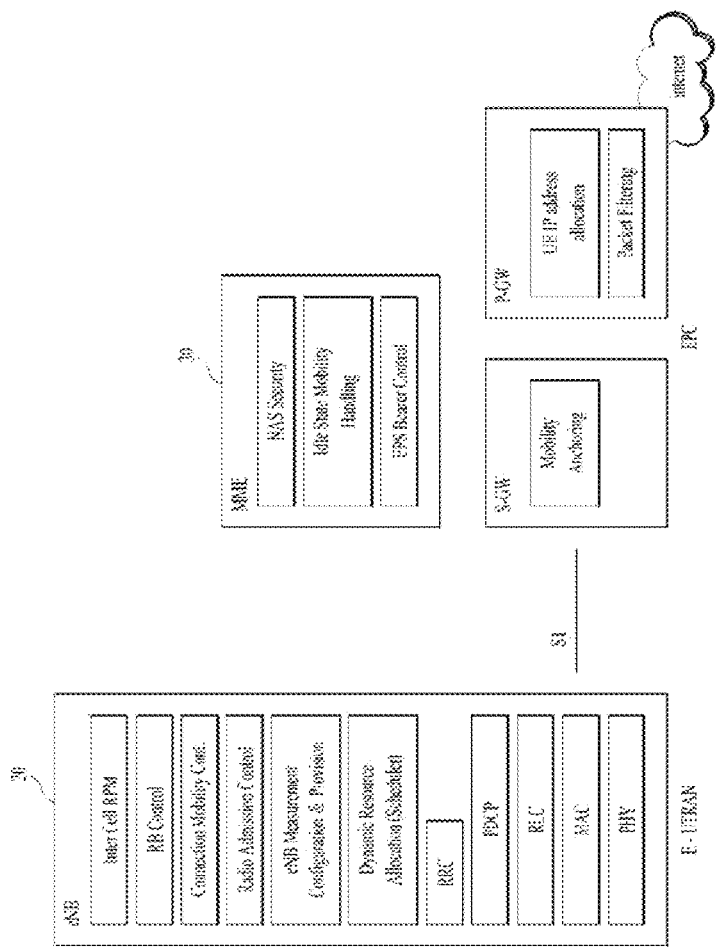
[Fig. 2B]

[Fig. 3]
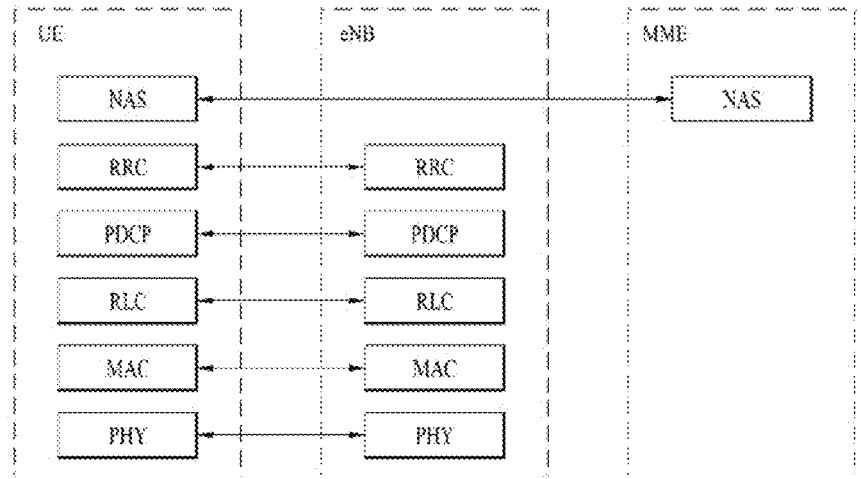
(a) Control-Plane Protocol Stack
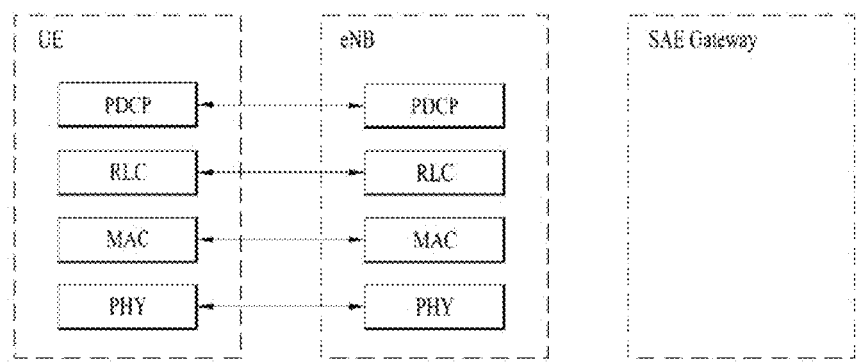
(b) User-Plane Protocol Stack
[Fig. 4]
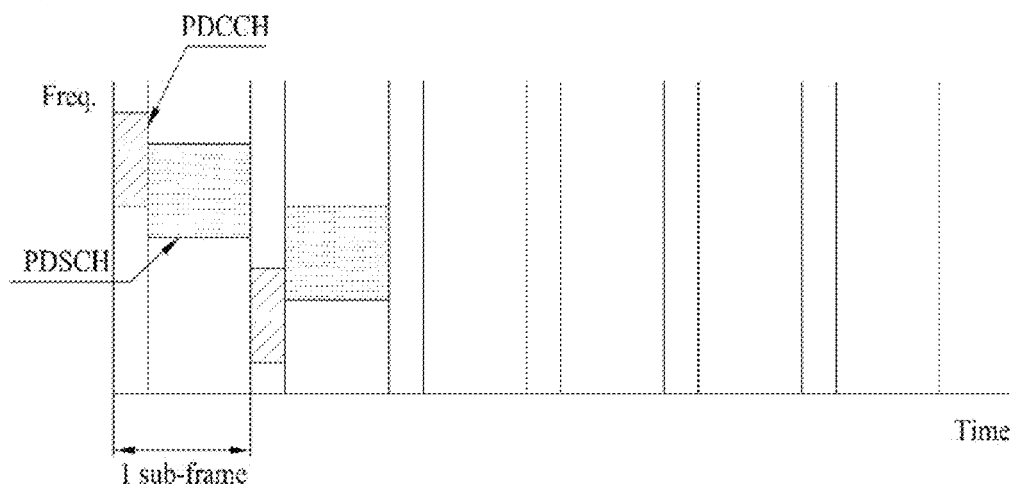

[Fig. 5]
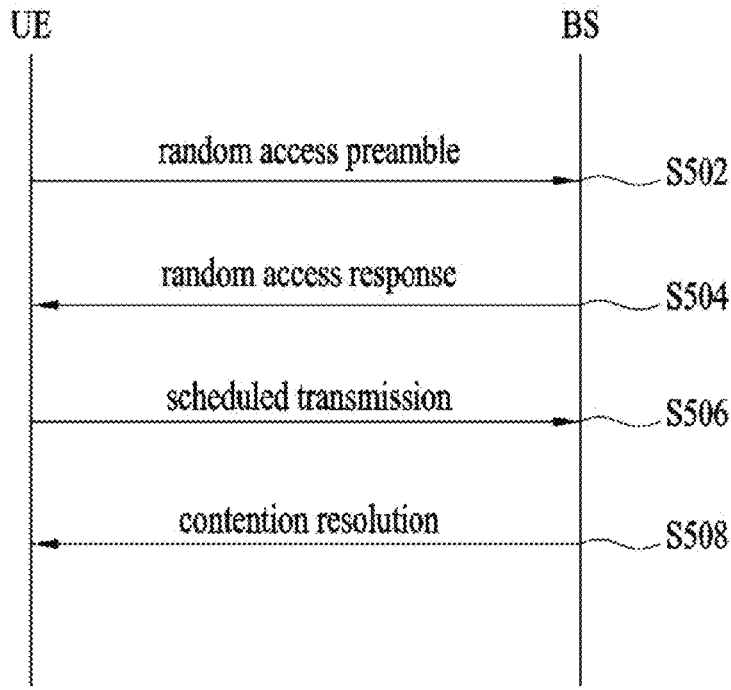
[Fig. 6]
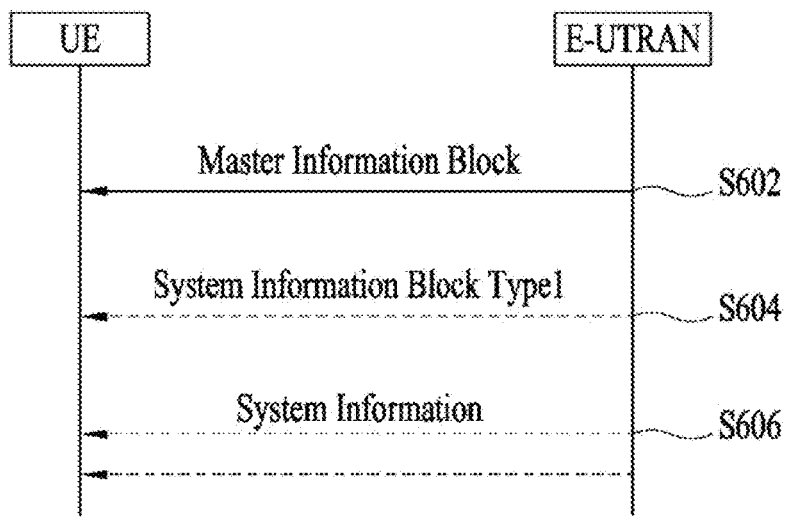
[Fig. 7]
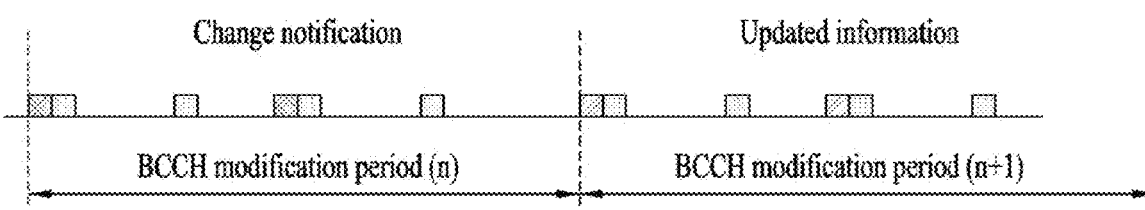

[Fig. 8]
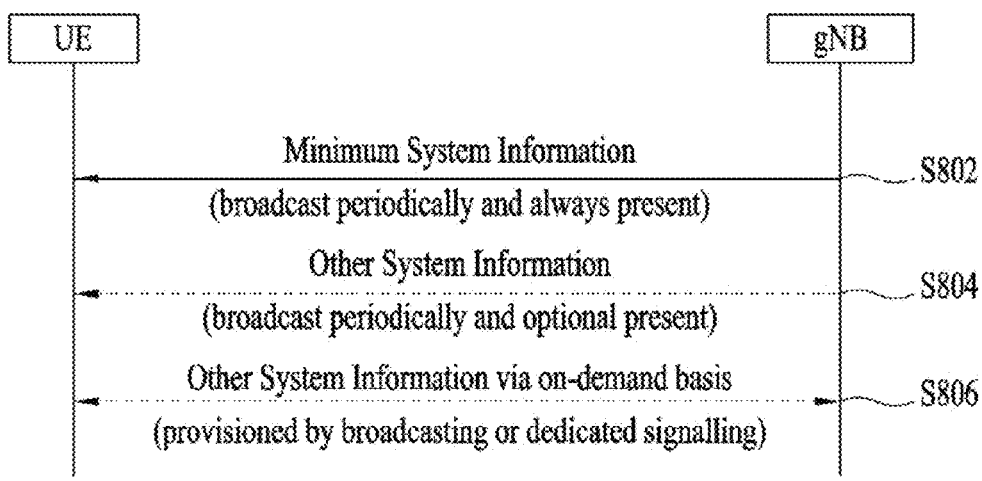
[Fig. 9]
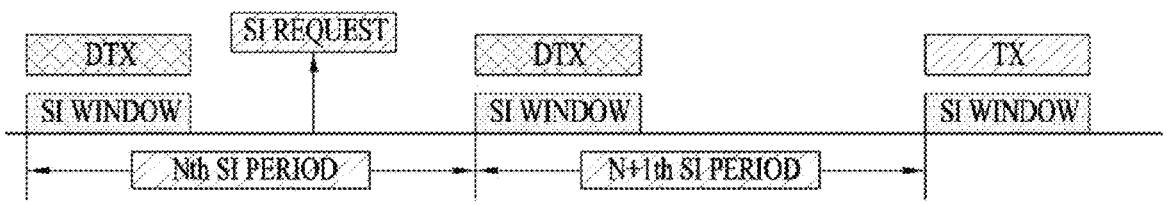

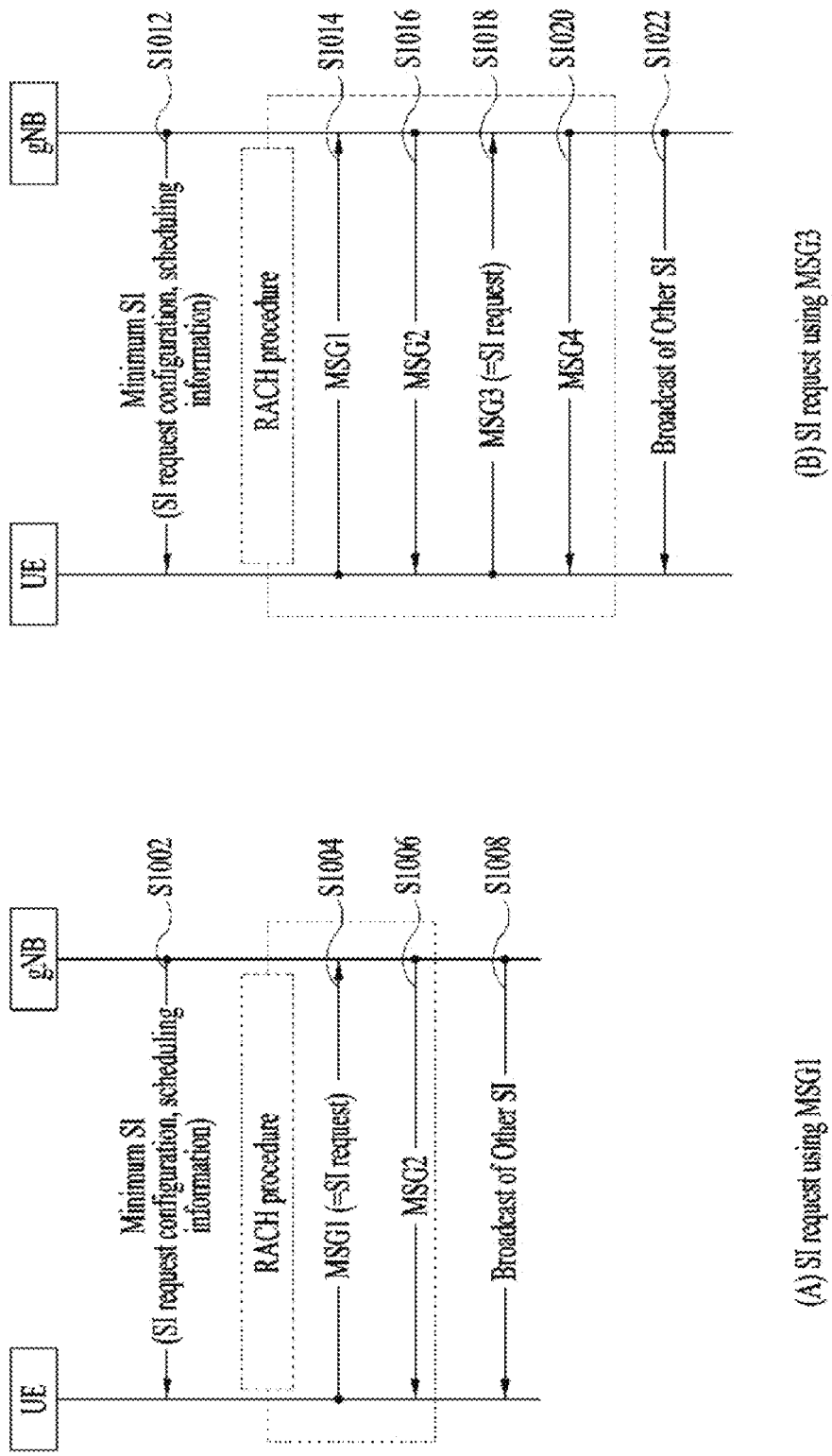

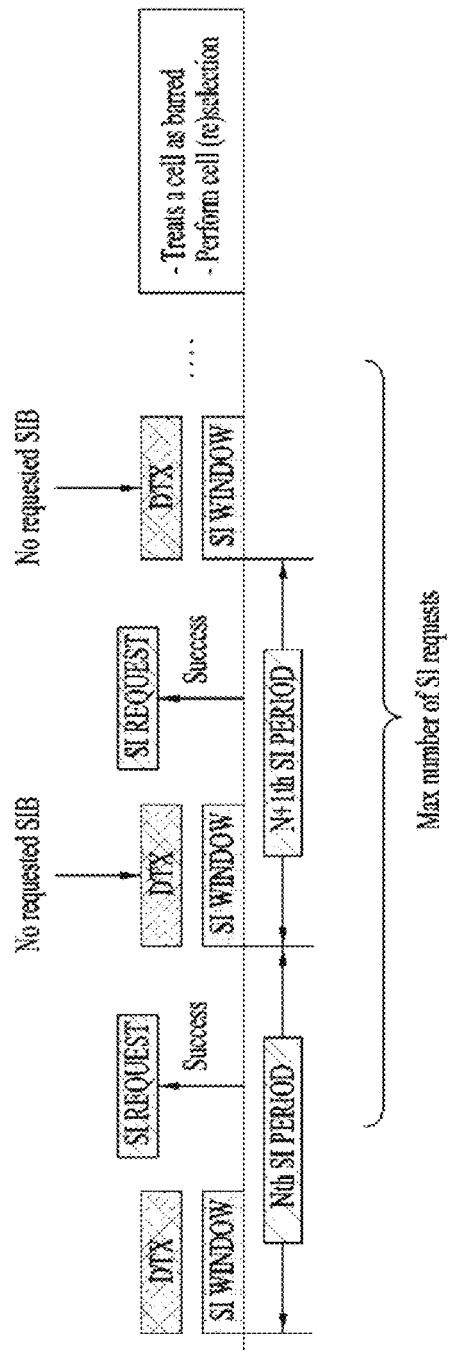

[Fig. 12]
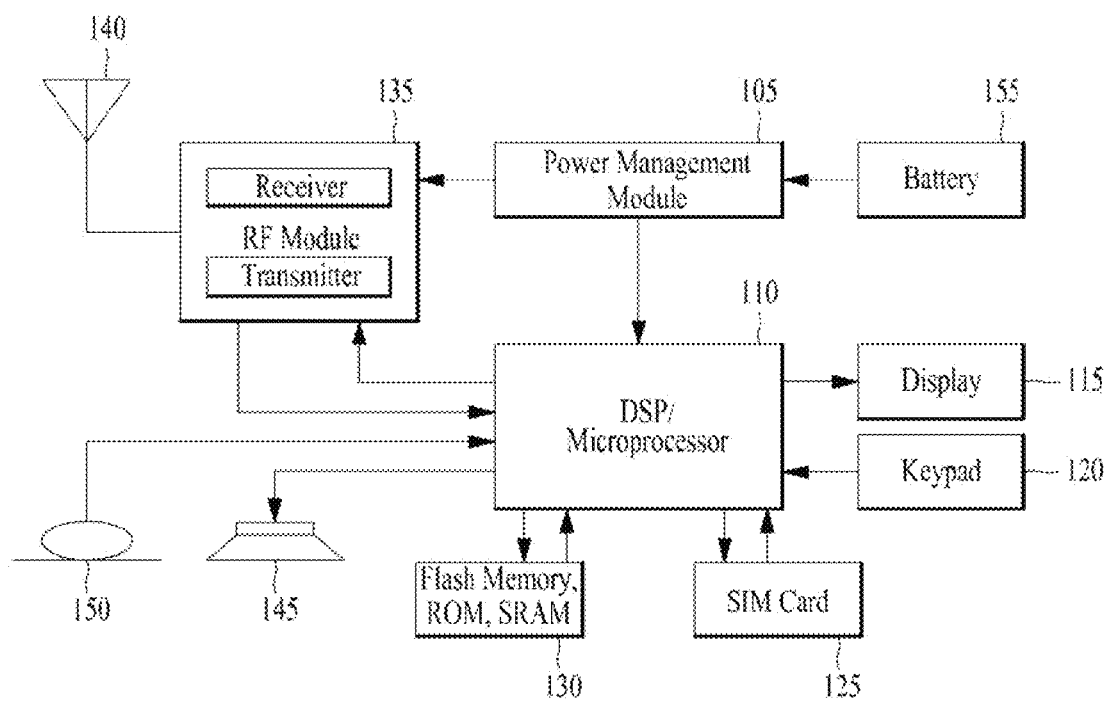

METHOD AND APPARATUS FOR OBTAINING SYSTEM INFORMATION

CROSS-REFERENCE TO RELATED APPLICATIONS

This application is a National Stage application under 35 U.S.C. § 371 of International Application No. PCT/KR2018/004989, filed on Apr. 30, 2018, which claims the benefit of U.S. Provisional Application No. 62/492,962, filed on May 2, 2017. The disclosures of the prior applications are incorporated by reference in their entirety.

TECHNICAL FIELD

The present invention is directed to a method and an apparatus for use in a wireless communication system. Specifically, the present invention is directed to a method and an apparatus to obtain system information.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE OF INVENTION

Technical Problem

An object of the present invention is to provide a method and an apparatus of efficiently obtain system information.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Solution to Problem

As an aspect of the invention, a method for a user equipment to obtain system information in a wireless communication system is provided. The method comprises: receiving essential System Information (SI) from a first cell, the essential SI including information for acquiring an on-demand SI; requesting the on-demand SI to the first cell; if the on-demand SI is not received from the first cell in a first specific period of time after the requesting the on-demand SI to the first cell is successful, re-requesting the on-demand SI to the first cell; and if the on-demand SI is not received from the first cell in a second specific period of time after a total number of requesting the on-demand SI to the first cell reaches a maximum value, re-selecting a second cell under assumption that the first cell is a barred cell.

As another aspect of the invention, a user equipment configured to obtain system information in a wireless communication system is provided. The user equipment comprises: a radio frequency (RF) unit; and a processor, wherein the processor is configured to: receive essential System Information (SI) from a first cell, the essential SI including information for acquiring an on-demand SI, request the on-demand SI to the first cell, if the on-demand SI is not received from the first cell in a first specific period of time after the requesting the on-demand SI to the first cell is successful, re-requesting the on-demand SI to the first cell, and if the on-demand SI is not received from the first cell in a second specific period of time after a total number of requesting the on-demand SI to the first cell reaches a maximum value, re-selecting a second cell under assumption that the first cell is a barred cell.

Preferably, the threshold value may be a plural number.

Preferably, the essential SI may include Master Information Block (MIB) and System Information Block Type 1 (SIB1).

Preferably, the second information may include an indicator for indicating whether or not an associated SI is provided on demand.

Preferably, the first and second specific periods of time may be separated from each other and periodically configured in a time domain.

Preferably, when the first is assumed to be the barred cell, the user equipment may stop camping on the first cell.

Preferably, the user equipment may be in an Radio Resource Control (RRC) idle state or an RRC inactive state. Also, the requesting of the on-demand SI is performed using an initial access procedure (e.g., a random access procedure).

Advantageous Effects of Invention

Exemplary embodiments of the present invention have the following effects. In accordance with the embodiments of the present invention, system information can be efficiently obtained.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a diagram of an example physical channel structure used in an E-UMTS system;

FIG. 5 is a diagram for examples of a random access procedure;

FIGS. 6~7 illustrate diagrams for system information acquisition;

FIGS. 8~9 illustrate diagrams for on-demand system information acquisition;

FIG. 10 illustrates SI request procedures;

FIG. 11 illustrates a procedure of SI acquisition according to the present invention; and FIG. 12 illustrates a block diagram of a User Equipment (UE).

MODE FOR THE INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE. 3GPP New Radio (NR) development is a part of continuous mobile broadband evolution process to meet the requirements of 5G as outlined by IMT-2020. 3GPP NR (simply, NR) is expected to expand and support diverse use case scenarios and applications that will continue beyond the current IMT-Advanced standard, for instance, enhanced Mobile Broadband (eMBB), Ultra Reliable Low Latency Communication (URLLC) and massive Machine Type Communication (mMTC).

Although the following embodiments of the present invention will hereinafter describe inventive technical characteristics on the basis of the 3GPP-based system (e.g., LTE/LTE-A/NR) system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB (or gNB). The cell is set to operate in one of bandwidths such as 1.4, 3, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which DL data is supposed to be transmitted, coding, a data size, and hybrid automatic repeat and request (HARD)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network. The NR network has a similar architecture except that: (1) gNBs and ng-eNBs are interconnected with each other by means of an Xn interface, instead of the X1 interface, and (2) the gNBs and ng-eNBs are also connected by means of the NG interfaces to access and mobility management function (AMF)/user plane function (UPF), instead of the MME/SAE, by means of NG interface, instead of the S1 interface.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for Public Warning System (PWS) (which includes Earthquake Tsunami Warning System (ETWS) and Commercial Mobile Alert System (CMAS)h) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.4, 3, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

The NR system has a similar architecture to the LTE(-A) systems. Specifically, at both a UE and a gNB, a user plane protocol stack is composed by the PHY, the MAC, the RLC, the PDCP, and a new Service Data Adaptation Protocol (SDAP) layer. The SDAP handles flow-based Quality of Service (QoS) framework in RAN, such as mapping between QoS flow and a data radio bearer, and QoS flow ID markings. A control plane protocol stack is composed by the PHY, the MAC, the RLC, the PDCP, and the RRC. The NAS is used to convey non-radio signalling between the UE and an Access and Mobility Management Function (AMF). The AMF is similar to MME of LTE(-A) system, and connected to the UE through a N1 interface.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Random Access Procedure

A random access procedure is used for various usages. For instance, a random access procedure is performed in case of an initial network access, a handover, a data occurrence or the like. A user equipment may be able to obtain UL synchronization via the random access procedure. Once the UL synchronization is obtained, a base station may be able to allocate a resource for UL transmission to the corresponding user equipment. The random access procedure may be classified into a contention based procedure and a non-contention based procedure.

FIG. 5 is a diagram for one example of a contention based random access procedure.

Referring to FIG. 5, a user equipment receives information on a random access from a base station via system information. Thereafter, if the random access is required, the user equipment transmits a random access preamble (or a message 1) to the base station (S502). Once the base station receives the random access preamble from the user equipment, the base station sends a random access response message (or, a message 2) to the user equipment (S504). In particular, a DL scheduling information on the random access response message may be transmitted on L1/L2 control channel (PDCCH) by being CRC masked with RA-RNTI (random access-RNTI). Having received the RA-RNTI masked DL scheduling signal, the user equipment receives the random access response message on PDSCH and may be then able to decode the received random access response message. Subsequently, the user equipment checks whether a random access response information indicated to the user equipment is included in the received random access response message. In doing so, a presence or non-presence of the random access response information indicated to the user equipment may be checked in a manner of checking whether RAID (random access preamble ID) for the preamble having transmitted by the user equipment is present or not. The random access response information may include a timing advance indicating a timing offset information for synchronization, a radio resource allocation information on a resource used in UL, a temporary identifier (e.g., T-RNTI) for user equipment (UE) identification and the like. Once the random access response information is received, the user equipment sends a UL message (or, a message 3) on UL SCH (uplink shared channel) in accordance with the radio resource allocation information included in the received random access response information (S506). Having received the UL message from the user equipment in the step S506, the base station sends a contention resolution message (or, a message 4) to the user equipment (S508).

System Information Acquisition

FIG. 6 illustrate a diagram for system information acquisition. System information is divided into the Master Information Block (MIB) and a number of System Information Blocks (SIBs). The MIB includes a limited number of most essential and most frequently transmitted parameters that are needed to acquire other information from a cell, and is transmitted on BCH (S604). The MIB uses a fixed schedule with a periodicity of 40 ms and repetitions made within 40 ms. The first transmission of the MIB is scheduled in subframe #0 of radio frames for which the System Frame Number (SFN) mod 4=0, and repetitions are scheduled in subframe #0 of all other radio frames. The SFN corresponds to an index of a radio frame and has a value of 0~1023. The System Information Block Type 1 (SIB1) uses a fixed schedule with a periodicity of 80 ms and repetitions made within 80 ms (S604). The first transmission of SIB1 is scheduled in subframe #5 of radio frames for which the SFN mod 8=0, and repetitions are scheduled in subframe #5 of all other radio frames for which SFN mod 2=0. SIBs other than SIB1 are carried in System Information (SI) messages (S606), and mapping of SIBs to SI messages is flexibly configurable by scheduling Info List included in SIB1, with restrictions that: each SIB is contained only in a single SI message, and at most once in that message; only SIBs having the same scheduling requirement (periodicity) can be mapped to the same SI message; System Information Block Type 2 (SIB2) is always mapped to a SI message that corresponds to the first entry in a list of SI messages in scheduling Info List.

There may be multiple SI messages transmitted with the same periodicity. SIB1 and all SI messages are transmitted on DL-SCH. The SI messages are transmitted within periodically occurring time domain windows (hereinafter, SI-windows) using dynamic scheduling. Each SI message is associated with a SI-window and the SI-windows of different SI messages do not overlap. That is, within one SI-window only a corresponding SI is transmitted. The length of the SI-window is common for all SI messages, and is configurable. Within the SI-window, the corresponding SI message can be transmitted a number of times in any subframe other than MBSFN subframes, uplink subframes in TDD, and subframe #5 of radio frames for which SFN mod 2=0. The UE acquires the detailed time-domain scheduling (and other information, e.g. frequency-domain scheduling, used transport format) from decoding SI-RNTI on PDCCH.

FIG. 7 illustrates Change of system Information. Change of system information (other than for ETWS, CMAS and EAB parameters) only occurs at specific radio frames, i.e. the concept of a modification period is used. System information may be transmitted a number of times with the same content within a modification period, as defined by its scheduling. The modification period boundaries are defined by SFN values for which SFN mod m=0, where m is the number of radio frames comprising the modification period. The modification period is configured by system information. When the network changes (some of the) system information, it first notifies the UEs about this change, i.e. this may be done throughout a modification period. In the next modification period, the network transmits the updated system information. In FIG. 7, different colors indicate different system information. Upon receiving a change notification, the UE using a DRX cycle that is smaller than or equal to the modification period acquires the new system information immediately from the start of the next modification period. Upon receiving a change notification applicable to eDRX, a UE in RRC_IDLE using a DRX cycle that is longer than the modification period acquires the updated system information immediately from the start of the next eDRX acquisition period. The UE applies the previously acquired system information until the UE acquires the new system information.

SIB1 includes a value tag, systemInfoValueTag, that indicates if a change has occurred in the SI messages. UEs may use systemInfoValueTag, e.g. upon return from out of coverage, to verify if the previously stored SI messages are still valid. Additionally, for other than Bandwidth reduced, Low complexity (BL) UEs or UEs in Coverage Enhancement (CE), the UE considers stored system information to be invalid after 3 hours from the moment it was successfully confirmed as valid, unless specified otherwise. BL UE or UE in CE considers stored system information to be invalid after 24 hours from the moment it was successfully confirmed as valid, unless the UE is configured by parameter si-ValidityTime to consider stored system information to be invalid 3 hours after validity confirmation.

Example: System Information Acquisition in NR

In NR, system information is divided into minimum (or essential) SI and other (or non-minimum/essential) SI. Each cell (i.e., not-barred cell) on which the UE is allowed to camp on may periodically broadcast at least some contents of the minimum SI, while there may be cells on which the UE cannot camp on and do not broadcast the minimum SI. If the UE cannot determine the full minimum SI of a cell (by receiving from that cell or from valid stored SI from previous cells), the UE shall consider that cell as barred. After acquisition of the full minimum SI of the cell, the other SI can be provided on demand (via a broadcast or dedicated signaling). The other SI encompasses everything not broadcast in the minimum SI. For example, cell-reselection neighboring cell information may be considered as other SI. Public Warning System (PWS) information can be also classified into the other SI.

FIGS. 8-9 illustrate diagrams for on-demand system information acquisition.

Referring to FIG. 8, the minimum SI is periodically broadcast (S802). The minimum SI may comprise basic information required for initial access to a cell and information for acquiring any other SI broadcast periodically or provisioned via on-demand basis. The minimum SI may also include at least one of: SFN, list of Public Land Mobile Network (PLMN), Cell ID, cell camping parameters, RACH parameters (e.g. a root index, a cyclic shift). If a network allows on demand mechanism, parameter(s) required for requesting other SI(s) (e.g., SIB(s)) (if any needed, e.g. RACH preambles for request) shall be included in minimum SI. Specifically, the minimum SI may be transmitted through MIB and SIB 1. MIB is always transmitted on BCH with a periodicity of e.g., 80 ms and repetitions made within e.g., 80 ms and includes parameters that are needed to acquire SIB1 from a cell. SIB1 is transmitted on DL-SCH with a periodicity and repetitions. SIB1 may include information regarding an availability and scheduling (e.g. periodicity, SI-window size) of other SI(s). The other SI may either be broadcast, or provisioned in a dedicated manner, either triggered by the network (S804) or upon request from the UE (S806). To this end, SIB1 may include information for indicating whether other SI(s) is provided via periodic broadcast basis or only on-demand basis. This indication can be made for all or a part of other SI(s). Also, a single indication can be made for other SI(s) or a separate indication can be made per each of other SI(s). If other SI(s) is provided via periodic broadcast basis, the network may transmit periodically the SIBs without request from a UE, and the UE receives the SIBs though the UE didn't request it (S804). In this case, SIB1 may include scheduling Info List which configures a mapping of SIB(s) to SI message(s). If other SI(s) is provided on-demand (e.g., the network allows the demand mechanism), the network may receive an SI request from a UE, and the UE receives the SIBs that the UE requested (S806). In this case, SIB1 may include information for a UE to perform an SI request. SI(s) other than SIB1 can be carried in SI messages, which is transmitted on DL-SCH. Each SI message is transmitted within periodically occurring time domain windows (SI-windows). SI windows are not overlap with each other.

Referring to FIG. 9, when the other SI(s) (e.g. SIB(s)) is provided on-demand, a UE can request one or more SIs or all SIs of the other SI(s), in a single request. For other SI required by the UE, before the UE sends a request for the required other SI, the UE needs to know whether the required other SI is available in the cell and whether the required other SI is broadcast or not. This can be done by checking the minimum SI (e.g., SIB1) which provides scheduling information for the other SI (e.g., SIB type), SI validity information, SI periodicity and SI-window information. The scheduling information in minimum SI (e.g., SIB1) may include an indicator whether a concerned SI (e.g., SIB (type)) is periodically broadcasted or provided on demand. If the minimum SI indicates that an SIB of interest is not broadcast, then UE does not assume that the SIB of interest is a periodically broadcasted in its SI-window at every SI periodicity. Therefore the UE may send an SI request to receive the SIB of interest. After sending the SI request, for receiving the SIB of interest, UE monitors an SI window of the requested SIB in one or more SI periodicities of that SIB. For example, if an SI request for an SIB is transmitted by a UE in $N^{th}$ SI period, then the requested SIB is assumed to be provided at/from the next SI period (i.e., $N+1^{th}$ SI period) of a corresponding SI message. The UE in RRC_IDLE or RRC_INACTIVE is able to request the other SI without state transitions. For the UE in RRC_CONNECTED, dedicated RRC signaling can be used for the SI request and delivery of the other SI. The other SI may be broadcast at configurable periodicity and for certain duration. It is network decision whether the other SI is broadcast or delivered through dedicated UE specific RRC signaling.

For easy understanding, examples of how a UE determines SIB(s) of interest are provided.

For SIBs relevant for particular feature/function (e.g. Multimedia Broadcast Multicast Service (MBMS), Single Cell Point To Multiploint (SCPTM), Extended Access Barring (EAB), Device to Device (D2D), Home eNB (HeNB), or WLAN interworking related SIBs), the UE may consider a SIB to be part of the SIBs of interest if the following conditions are met:

Condition 1: The UE doesn't have valid SIB for the feature/function; and

Condition 2: The feature/function is supported in RRC state of the UE; and

Example: An UE supports feature 'A' and 'B'. The 'A' is supported in both RRC_CONNECTED and IDLE mode whereas 'B' is supported only in RRC_CONNECTED mode. If the UE is in RRC_IDLE mode, the UE considers SIBs relevant for 'A' to be part of the SIBs of interest but doesn't consider SIBs relevant for 'B' to be part of the SIBs of interest.

Condition 3: The UE determines it cannot acquire the SIB without request within a certain time; and Example: when the SIB is not broadcast periodically.

Condition 4: The UE capability supports the feature/function; and

Example: Only MBMS capable UE is able to consider the MBMS related SIBs to be part of the SIBs of interest.

Condition 5: If the feature/function is available only when the UE internal conditions are met, the UE considers a SIB relevant for the feature/function to be part of the SIBs of interest if the UE internal condition is suitable to activate the feature/function; and Example: Though an UE capability supports WLAN interworking, the UE cannot perform the WLAN interworking when the UE internal condition is as follows:

When WLAN module in the UE is POWER-OFF; or

When WLAN module in the UE is connected to non-WLAN interworking capable Access Point (AP) and the AP has a higher priority than others according to user preference; or When UE has no offloadable traffic to WLAN.

In these cases, the UE doesn't consider WLAN interworking related SIBs to be part of the SIBs of interest. The UE considers WLAN interworking related SIBs to be part of the SIBs of interest only when the following conditions are met.

If WLAN module in the UE is POWER-ON, and

If the WLAN module in the UE is not connected with any WLAN AP or is connected with WLAN interworking capable AP, and If UE has some offloadable traffic to WLAN.

Condition 6: If the feature/function is available only when the UE is interested in the feature/function, e.g. MBMS or SC-PTM, the UE considers a SIB relevant for the feature/function to be part of the SIBs of interest if the UE is interested in this feature/function.

If there are two SIBs relevant for a feature/function, and the first SIB is used to check whether the UE is interested in the feature/function and the second SIB is used to perform the feature/function, the UE considers the first SIB relevant for the feature/function regardless of the interest of the feature/function while the UE considers the second SIB relevant for the feature/function only if the UE is interested in the feature/function.

Step 1: UE considers the first SIB relevant for feature 'A' to be part of the SIBs of interest and requests the first SIB to network.

Step 2: UE receives the first SIB from network.

Step 3: UE determine whether it is interested in the 'A' based on the first SIB.

Step4: If the UE is interested in the 'A', the UE considers the second SIB relevant for 'A' to be part of the SIBs of interest and requests secondary SIB relevant for 'A' to the network.

Step5: UE receives the second SIB from network.

For example, for an UE that supports MBMS,

Step 1: UE considers SIB 15 to be part of the SIBs of interest and requests SIB 15 to network.

Step 2: UE receives SIB 15 from network.

Step 3: UE determine whether it is interested in the MBMS based on the SIB 15.

Step 4: If the UE is interested in the MBMS, the UE considers the SIB 13 to be part of the SIBs of interest and requests SIB 13 to the network (e.g., gNB). Desirably, the UE also requests other MBMS related information, e.g. MBSFN area configuration.

Step 5: UE receives SIB 13 and other MBMS related information from network.

For SIB which is essential for all UEs in a certain RRC state regardless of UE capability, the UE considers a SIB to be part of the SIBs of interest if the following conditions are met:

Condition 1: The UE doesn't have a valid version of the SIB; and

Condition 2: The UE determines it cannot acquire the SIB without request within a certain time; and Example: when the SIB is not broadcast periodically.

Condition 3: The UE is in the certain RRC state; or

Condition 4: The UE considers it will soon be in the certain RRC state.

Example 1: When an UE becomes RRC_IDLE mode, the UE considers the SIBs which are essential for RRC_IDLE mode, e.g. cell re-selection related SIBs, to be part of the SIBs of interest if the UE doesn't have a valid version of that.

Example 2: When an UE receives RRC connection release message, the UE considers the SIBs which are essential for RRC_IDLE mode to be part of the SIBs of interest if the UE doesn't have a valid version of that.

FIG. 10 illustrates SI request procedures. It is assumed that a UE is in RRC_IDLE or RRC_INACTIVE. In this case, the SI request can be performed using an initial access procedure (e.g., a random access procedure).

Referring to FIG. 10, the UE receives minimum SI from a network (e.g., gNB) (S1002, S1012). The minimum SI may include SI request configuration and scheduling information. If the minimum SI indicates that other SIB(s) is not broadcast (or provided on demand), the UE may perform an SI request using a random access procedure. The SI request procedure is basically the same as the random access procedure of FIG. 5, except that a message 1 (MSG1, S1004)

or a message 3 (MSG3, S1018) is used to inform the SI request. When MSG1 is used for the SI request (S1004), a specific contention-based preamble sequences is used for informing the SI request, and the SI request procedure is success when MSG2 is successfully received (S1006). When MSG3 is used for the SI request (S1018), the SI request procedure is success when MSG4 is successfully received (S1020). After the success of the SI request procedure, the UE may receive the other SI through a broadcast channel during a next SI period after the SI request procedure is successfully completed (S1008, S1022).

In order to enhance an SI request procedures, the following proposals can be considered.

Proposal 1: After Sending SI Request Using MSG1, UE Receives MSG2 to Check Whether the SI Request is Successful or not If an SI request is transmitted through MSG1 of a random access procedure (see, (A) of FIG. 10), it is obvious that an UE doesn't send MSG3 after sending the SI request using MSG1. However, there is still a need to further study whether the UE needs to receive MSG2 after sending MSG1 for SI request purpose.

In a legacy random access procedure (see, FIG. 5), a UE receives MSG2 to acquire a timing advanced command, UL grant and/or temporary C-RNTI. MSB2 is included in a MAC Protocol Data Unit (PDU). The MAC PDU includes a MAC header and a MAC payload. The MAC header includes one or more MAC sub-headers (for example, E/R/RAID sub-headers) and the MAC payload includes one or more MAC Random Access Responses (RARs) (i.e., MSG2). The MAC sub-headers correspond to the MAC RARs, respectively. The MAC sub-header includes a RAID field, which includes a Random Access preamble ID (RAID). The RAID is used to identify a random access preamble transmitted from a UE. Each MAC RAR includes a TA field for the timing advanced command, a UL grant field, and a temporary C-RNTI field.

But, when the UE sends MSG1 for SI request purpose, such information is not needed. However, the UE still needs to know whether the SI request is successful or not. To this end, a MAC PDU may include a MAC sub-header includes information (e.g., a specific RAID) related with identifying that the SI request is successful, without a corresponding MAC RAR payload. Accordingly, if the UE receives MSG2 containing an RACH resource identifier (e.g., RAID) that matches the transmitted RACH resource (e.g., RA preamble), the UE is able to consider the SI request is successful. On the contrary, if no MSG2 is received within the MSG2 window, or if none of all received MSG2 contains a RACH resource identifier corresponding to the transmitted RACH resource, the SI request using MSG1 is considered not successful and the UE will retry the SI request procedure.

Proposal 2: After Sending an SI Request Using MSG3, a UE Receives MSG4 to Check Whether the SI Request is Successful or not For the same reason as the proposal 1, it is also proposed that a UE receives MSG 4 to know whether an SI request is successful or not after sending the SI request using MSG3.

Proposal 3: After a Successful SI Request, a UE Doesn't Need to Re-Acquire Minimum SI If an SI request is successful, a network (e.g., gNB, cell) may update minimum SI in order to inform UEs that the requested SIB(s) will be broadcast. The target of the additional broadcast indication is a UE which doesn't yet send the SI request, not a UE which already sent the SI request. Thus, after successful reception of MSG2/MSG4, a UE doesn't need to re-acquire minimum SI.

Proposal 4: After a Successful SI Request, if a UE Doesn't Receive the Requested SI from a Network (e.g., gNB, Cell), the UE Doesn't Re-Try the SI Request Procedure If a UE doesn't receive successful MSG2/4 after sending an SI request using MSG1/3, it is desirable that the UE re-transmits the MSG1/3. In this case, the UE performs the SI request procedure again after waiting a specific period of time (i.e., back-off time, which may be larger than a SI window periodicity (e.g., multiples of the SI window periodicity)).

However, a retransmission of the SI request is useful only when a network (e.g., gNB, cell) doesn't receive an initial transmission of the SI request successfully. So, after a successful SI request, it is not desirable for the UE to re-transmit the SI request to the network (e.g., gNB, cell). If there is no re-transmission of SI request after the successful SI request, the UE may keep camping on a current cell without acquiring other-SI or treat the current cell as barred. In LTE there is no specified UE behavior when it is unable to acquire non-essential SIB, e.g. all SIBs except MIB and SIB1. The other-SI in NR corresponds to non-essential SIB in LTE. If the UE keeps camping on the cell, it will not receive a certain service from serving cell, e.g. MBMS reception. Therefore, in NR, if the UE doesn't receive the requested SI from the network within a specific period of time (e.g., the next L consecutive SI period(s), L is a positive integer) after successful SI request, it is preferable that the UE treats the cell as barred.

Here, the wording "camped on a cell" means that a UE has completed a cell selection/reselection process and has chosen a cell, where the UE monitors system information and (in most cases) paging information. And, the wording "a cell treated as barred" or "barred cell" means a cell the UE is not allowed to camp on. So, if the current cell is treated as barred, the UE may perform a cell (re)selection procedure. The cell (re)selection procedure is a kind of mechanism to change cells after the UE is camped on a cell and stay in RRC_IDLE mode. Specifically, the UE perform measurements for cell (re)selection purposes, selects a suitable cell based on idle mode measurements and cell selection criteria, and camps on a suitable cell where the UE tunes to the cell's control channel(s) so as to receive SI, tracking information, a paging/notification message.

Proposal 5: After a Successful SI Request, if a UE Doesn't Receive the Requested SI from a Network (e.g., gNB, Cell) within a Specific Period of Time, the UE should Retry the SI Request Procedure The successful SI request is no guarantee of a reception of the requested SI since whether to transmit or not is a network implementation. So if a UE doesn't receive the requested SI from a network (e.g., gNB, cell) within a specific period of time (e.g., the next L consecutive SI period(s), L is a positive integer) after the successful SI request (e.g., successful reception of MSG2/MSG4)(see, S1006, S1018), it is may not be preferable that the UE immediately treats a cell to which the SI request is made as barred and performs a cell (re)selection procedure since the transmission of the requested SI can be possible soon up to network's situations. Thus the proposal 4 may cause frequent cell (re)selection procedures unnecessarily. Thus, after a successful SI request, if a UE doesn't receive the requested SI from a network (e.g., gNB, cell) within a specific period of time, it may be preferable that the UE retries the SI request procedure (e.g., after M consecutive SI period(s) from an end of the specific period of time, M is an integer of 0 or more).

As noted in proposal 4, LTE has no specified UE behavior when a UE is unable to acquire non-essential SIB, i.e. all SIBs except MIB and SIB 1. The other-SI in NR corresponds to non-essential SIB in LTE. However, the difference between LTE and NR is that the UE needs to send an SI request to acquire the other-SI. If UE behavior when it is unable to acquire other-SI is not specified, the UE will keep trying to send the SI request. To avoid this situation, UE behavior should be specified in NR. For example, if the number of SI request reaches a maximum number of SI requests (but if the UE doesn't receive the requested SI from the network (e.g., gNB, cell) within a specific period of time (e.g., the next L consecutive SI period(s), L is a positive integer) after the last successful SI request), two UE behaviors can be considered. Here, the maximum number of SI requests is a plural number, and the number of SI request is counted only when an SI request is succeeded (e.g., successful reception of MSG2/MSG4). The first UE behavior is that the UE gives up acquisition of the other-SI while keeping camping on a current cell. And, the second UE behavior is that the UE treats the current cell as barred, like the UE does when essential SIB is missed in LTE. If the UE keeps camping on the current cell, the UE will not receive a certain service from the current cell, e.g. MBMS reception. Therefore, if the number of SI request reaches a maximum number of SI requests (but if the UE doesn't receive the requested SI from the network (e.g., gNB, cell) within a specific period of time (e.g., the next L consecutive SI period(s), L is a positive integer) after the last successful SI request), it may be preferable that the UE treats the current cell as barred, and performs a cell (re)selection procedure to camp on another cell (see, explanation of proposal 4).

FIG. 11 illustrates a procedure of SI acquisition according to the present invention. It is assumed that a UE is in an Radio Resource Control (RRC) idle state or an RRC inactive state. One or more cells can be configured/managed by a gNB.

Referring to FIG. 11, the UE receives essential System Information (SI) from a first cell (not shown). The essential SI may include information for acquiring an on-demand SI. The essential SI may also include information required for initial access (e.g., random access procedure). For example, the essential SI may include MIB and SIB1, and the second information includes an indicator for indicating whether or not an associated SI is provided on demand. Then, the UE may request the on-demand SI to the first cell. If the on-demand SI is not received from the first cell in a first specific period of time after the requesting the on-demand SI to the first cell is successful, the UE re-requests the on-demand SI to the first cell. Here, the requesting of the on-demand SI is performed using an SI request procedure (e.g., an initial access procedure such as a random access procedure). Finally, if the on-demand SI is not received from the first cell in a second specific period of time after a total number of requesting the on-demand SI to the first cell reaches a maximum value (e.g., plural number), the UE may perform a cell (re)selection procedure to camp on a second cell under assumption that the first cell is a barred cell.

Proposal 6: MSG3 Includes a Bitmap, where Bit N is Set to "a" if a UE Wants to Receive Nth SIB A network may broadcast a SI (block) list that the network supports through minimum SI. For example, if cell A is able to provide SIB 3, 4 and 7 when a UE requests it, then only SIB 3, 4 and 7 are listed in minimum SI.

When the UE request other-SIB(s) using MSG3, it may construct a bitmap as follows:
if the UE wants to receive $N^{th}$ SI (block), the UE may set bit N to "a". Here, bit N means $N^{th}$ bit in the bitmap, and "a" is 1 or 0.
The size of the bitmap is equal to the number of other-SIBs listed in the minimum SI.
The UE includes the bitmap in the MSG3.
For instance, if SIB 4, 8 and 9 are listed in the minimum SI, and an UE needs to acquire SIB 8 and 9, then the UE may sets the bitmap to "011". The first '0' corresponds to SIB4, and second '1' corresponds to SIB8.

Proposal 7: If RACH Resource is Reserved for Only Part of SIB(s) a UE Needs to Acquire, the UE Uses MSG3 to Send SI Request (i.e. UE Uses Common RACH Resource)

RACH resource (e.g., RA preamble) may be reserved for only part of SIB(s) the UE needs to acquire. For instance, an UE wants to receive SIB 3, 4 and 5, but there is no RACH resource (e.g., RA preamble) mapped to them. In this case, if a RACH resource (e.g., RA preamble) reserved for SIB 3 and 4 is included in the minimum SI, two UE behaviors can be considered.
Option 1: UE uses both MSG1 and MSG3 for SI request. For example, UE may request SIB 3 and 4 using MSG1 (see, proposal 1), and requests SIB 5 using MSG3 (see, proposals 2, 6).
Option 2: UE uses only MSG3. For example, UE may request SIB 3, 4 and 5 using MSG3 (see, proposals 2, 6).

Anyway, MSG3 transmission cannot be avoided. In addition, Option 1 requires additional indicator in MSG1 to request UL grant via MSG2. Generally, a network receives MSG1 including an SI request, it will not provide UL grant to the UE. To avoid such additional complexity in MSG1, if RACH resource is reserved for only part of SIB(s) the UE needs to acquire, the UE should use MSG3 to send SI request.

FIG. 12 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, a proximity-based service for public safety.

The invention claimed is:

1. A method for a user equipment (UE) to obtain system information in a wireless communication system, the method comprising:
    receiving, by the UE, a Master Information Block (MIB) including parameters that are needed to acquire other information from a first cell on a broadcast channel (BCH),
    receiving, by the UE, a System Information Block Type 1 (SIB1) from the first cell, the SIB1 including information for acquiring an on-demand SI;
    requesting, by the UE, the on-demand SI to the first cell;
    based on the on-demand SI being not received from the first cell in a first specific period of time after the requesting the on-demand SI to the first cell is successful, re-requesting the on-demand SI to the first cell; and
    based on the on-demand SI being not received from the first cell in a second specific period of time after a total number of requesting the on-demand SI to the first cell reaches a maximum value, re-selecting a second cell under assumption that the first cell is a barred cell.

2. The method of claim 1, wherein the maximum value is a plural number.

3. The method of claim 1, wherein the SIB1 includes an indicator for indicating whether or not an associated SI is provided on demand.

4. The method of claim 1, wherein the first and second specific periods of time are periodically configured in a time domain.

5. The method of claim 1, wherein when the first cell is assumed to be the barred cell, the user equipment stops camping on the first cell.

6. The method of claim 1, wherein the user equipment is in an Radio Resource Control (RRC) idle state or an RRC inactive state, and the requesting of the on-demand SI is performed using a random access procedure.

7. A user equipment (UE) configured to obtain system information in a wireless communication system, the user equipment comprising:
    a radio frequency (RF) unit; and
    a processor, wherein the processor is configured to:
    receive a Master Information Block (MIB) including parameters that are needed to acquire other information from a first cell on a broadcast channel (BCH),
    receive a System Information Block Type 1 (SIB1) from the first cell, the SIB1 including information for acquiring an on-demand SI,
    request the on-demand SI to the first cell,
    based on the on-demand SI being not received from the first cell in a first specific period of time after the requesting the on-demand SI to the first cell is successful, re-requesting the on-demand SI to the first cell, and
    based on the on-demand SI being not received from the first cell in a second specific period of time after a total number of requesting the on-demand SI to the first cell reaches a maximum value, re-selecting a second cell under assumption that the first cell is a barred cell.

8. The user equipment of claim 7, wherein the maximum value is a plural number.

9. The user equipment of claim 7, wherein the SIB1 includes an indicator for indicating whether or not an associated SI is provided on demand.

10. The user equipment of claim 7, wherein the first and second specific periods of time are periodically configured in a time domain.

11. The user equipment of claim 7, wherein when the first is assumed to be the barred cell, the user equipment stops camping on the first cell.

12. The user equipment of claim 7, wherein the user equipment is in an Radio Resource Control (RRC) idle state or an RRC inactive state, and the requesting of the on-demand SI is performed using a random access procedure.

\* \* \* \* \*